May 8, 1951 A. G. COOLEY 2,551,726

FACSIMILE SCANNING APPARATUS

Filed May 22, 1946 2 Sheets-Sheet 1

INVENTOR.
A. G. COOLEY

BY E. D. Evans his ATTORNEY

May 8, 1951 A. G. COOLEY 2,551,726
FACSIMILE SCANNING APPARATUS
Filed May 22, 1946 2 Sheets-Sheet 2

INVENTOR.
A. G. COOLEY
BY E. R. Evans
his ATTORNEY

Patented May 8, 1951 2,551,726

UNITED STATES PATENT OFFICE 2,551,726

FACSIMILE SCANNING APPARATUS

Austin G. Cooley, New York, N. Y., assignor to Times Facsimile Corporation, New York, N. Y., a corporation of New York Application May 22, 1946, Serial No. 671,456

5 Claims. (Cl. 178—7.1)

This invention relates to scanning apparatus, more particularly for scanning printed or typed copy in facsimile transmission.

An object of the invention is to increase the definition or speed of scanning printed or "black and white" copy for facsimile transmission.

Another object of the invention is to improve the efficiency of facsimile transmitting methods and apparatus.

The invention is preferably embodied in a facsimile transmitter or the like which is provided with optical scanning means for deriving image signals representing the fluctuations in the light reflected from elemental scanning areas of the copy. In such apparatus, light-sensitive means is employed to generate image signals related to the tone values of the copy and which may be employed to reconstitute the copy in legible form at a distant point. In transmitting printed or typed messages, printed with comparatively large type, the size of the individual letters permits the copy to be scanned rapidly with a relatively coarse feed, thus reducing the time required to transmit copy of a given area, providing legibility and not detailed reproduction is sufficient. The limitation as to speed and coarseness of scanning is determined to a large extent by the thickness of the individual lines forming the letters. Ordinarily, means for modifying or clipping the "marking" signals are necessary in order to sharpen up the recorded copy and make it more legible. However it is not practical to generate a marking signal on less than about 30% of black. It will be apparent that increasing the width of the scanning line much above the width of the lines forming the letters, even when clipping is used, introduces the difficulty that the received copy will be seriously affected as to legibility because of the complete loss of portions of certain of the letters. Heretofore this has been an important factor in limiting the speed of transmission of message copy by marking and spacing signals.

In accordance with the invention, improved definition or greater speed of transmission with the same definition is obtained by a multiple-scanning arrangement. In its preferred form the multiple-scanning arrangement according to the invention employs a plurality of photocells, each adapted to respond to the light received from a different scanning area or from adjacent or overlapping portions of a single scanning area. The term "scanning area" refers to the elemental area being scanned at any instant to generate a marking or a spacing electrical signal related to the tone value of said area. The invention further embodies means for producing an output signal wave which is jointly controlled by the plurality of photocells in such a manner that the signal may be utilized to reconstitute the copy in a legible form.

For example, the scanning apparatus may comprise two photocells associated with a dual optical system so that each cell responds to or scans half the width of the scanning line or strip. Thus a thin line of the copy will produce a greater effect upon one of the photocells than if only a single cell were employed to scan the entire line width where the black or "marking" area being scanned is of substantially less width than the total scanning width. An amplifier and keying system may be provided for generating a marking signal if either or both of the photocells respond to the "marking" condition. Obviously, the system may be used for either positive or negative transmission, so that the "marking" condition may be represented by either a current or no-current signal; and three or more photocells can be used to control the output signal, if desired.

In this manner a signal is generated which enables legible recording to be effected with a coarse feed (wide scanning line). The importance of this result resides in the fact that the speed of transmission may be doubled without substantially impairing the legibility of the copy in the case of facsimile transmission of printed messages.

Other objects and advantages of the invention will appear from the following detailed description of the preferred embodiments shown in the accompanying drawings, wherein Fig. 1 illustrates a scanning arrangement embodying the invention, omitting the electrical circuits;

Figure 1:
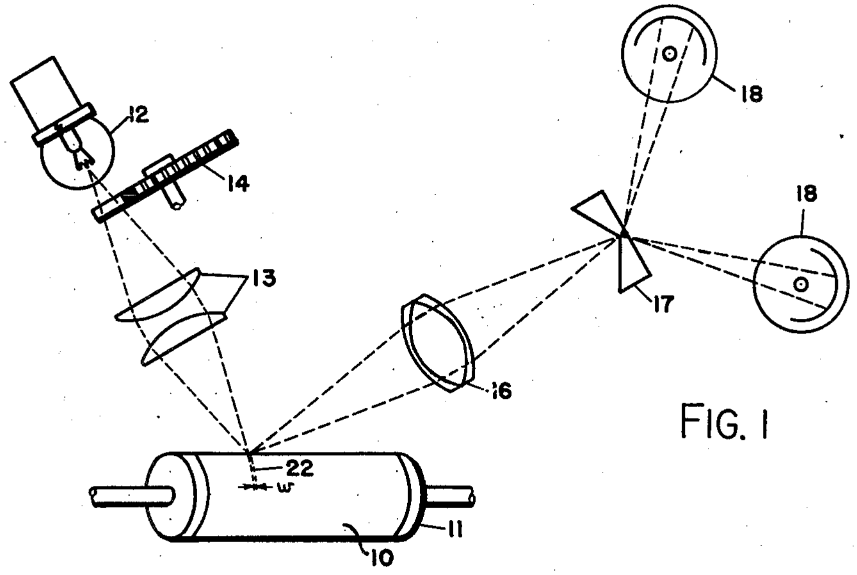

Referring to the drawings, Fig. 1 shows the elements of a facsimile transmitter by way of example, although the invention may be applied to other apparatus as will be apparent. In the embodiment shown, 10 represents the copy or message to be transmitted, the copy being mounted upon a suitable support or holder such as the rotatable drum 11. As shown, an exciter lamp 12 is used in conjunction with a condensing lens system 13 for intensely lighting a spot on the copy to be transmitted. The beam of light from the exciter lamp is interrupted periodically by a rotating chopper wheel 14 in the usual manner. Ordinarily the drum 11 is arranged to advance past the scanning apparatus as it rotates but, if desired, the drum 11 may be rotated between fixed pivots and the scanning apparatus arranged to move transversely to scan the copy 10 from beginning to end. Since these structural details are well known in the art, they are not illustrated in the drawing, for the sake of simplicity.

Figures 2, 3:
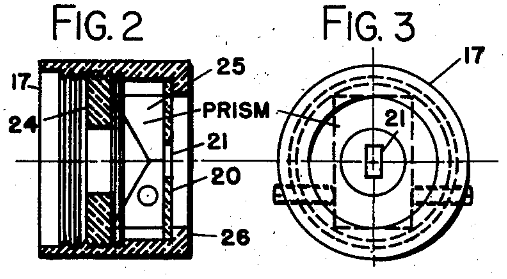
Figs. 2 and 3 are sectional and end elevational views of the prism of Fig. 1.

The scanning apparatus in a preferred form of the invention comprises an objective lens 16 and a light-directing unit 17 arranged to direct light from the scanned area upon a plurality of pickup units 18, such as photo-electric cells. In the construction shown by way of example, the light-directing means 17 consists of a double wedge or optical prism which is effective to break up the beam impinging on the central axis thereof into two divergent beams. The scanning area may be delineated by providing an aperture plate 20 in the optical system as shown in Fig. 2. Thus the scanning apparatus may be focused upon the surface of the copy to divide the scanning area defined by the aperture 21 into two equal parts and cause the excitation of each photocell to correspond to the tone value of each half of the scanning area. As the drum 11 rotates, the copy is scanned along a scanning line 22 of width *w*, each half of the scanning line being scanned by one of the photocells 18.

The light-directing unit 17, as shown in Figs. 2 and 3, may comprise a substantially circular shell which is threaded to receive an internal clamping nut 24, adapted to clamp the optical wedge or prism 25 against the end wall 26 of the shell. The aperture plate 20 having an aperture 21 may be interposed between the prism and the end wall 26. As shown, the aperture 21 is of generally rectangular outline but may be varied in configuration to meet the requirements of particular applications. The dual optical system may be designed to excite each pickup unit in accordance with proximate or complementary divisions of the scanning area, or separated or overlapping divisions thereof. However, the division of the scanning area into two substantially equal non-overlapping parts appears to have certain advantages and in most cases is preferred.

Figure 7:
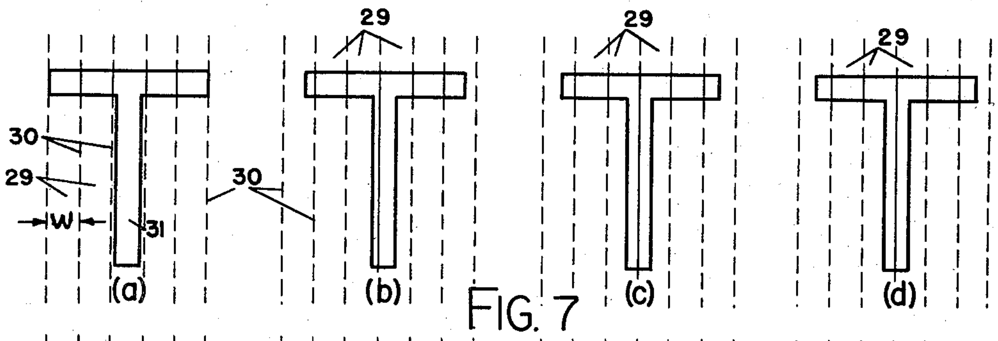
Figs. 7, 8 and 9 are explanatory views of original and recorded letters to an enlarged scale.
Figure 6:
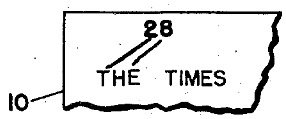
Fig. 6 is a fragmentary view of a piece of Teletype copy representing copy to be transmitted.

The most important application of the invention appears to be in connection with the transmission of typed or printed letters in message copy and the operation will therefore be explained in connection with such apparatus although it is not limited to this field or class of apparatus. In Fig. 6 the copy 10 is shown as bearing typed letters 28 similar to those formed by the standard teletypewriter. These letter characters are relatively large but on account of the thinness of the lines composing the letters, heretofore relatively fine scanning has been required to satisfactorily transmit such copy by facsimile. Fig. 7 shows the letter "T" of the copy drawn in relation to the scanning lines 29 represented by the area between the broken lines 30. Obviously, these scanning lines 29 may fall at various points across the width of the letter, and Fig. 7 represents several possible spatial relations between the letter and the scanning lines. While the letters are shown on the drawing in outline for the sake of clarity, it will be understood that they are actually solid black in the message copy.

In Fig. 7*a* the stem 31 of the T as shown is slightly narrower in width than the scanning line and falls in the center of the line. In the case of lines which are even thinner compared with the scanning line, the loss of legibility in transmission becomes even more pronounced than with the letters shown herein. In Fig. 7*b* the same letter is shown in a position where the stem of the T covers about one-half of one scanning line and one-quarter of the adjacent scanning line. Since the letters of the message are of random spacing, the regularly spaced scanning lines may line up with the letters in various ways, as indicated in Fig. 7.

Figure 8:
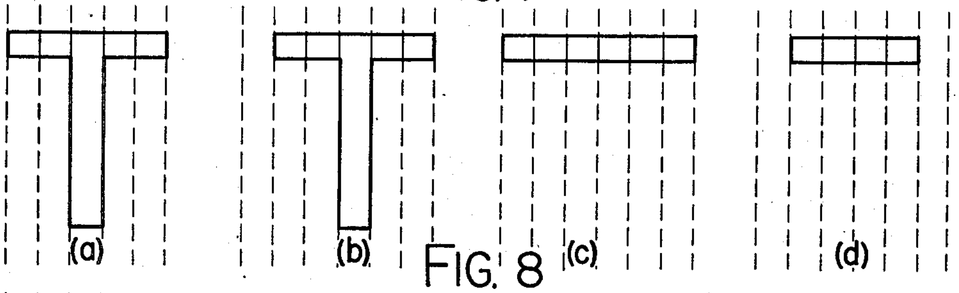

Fig. 8 illustrates the same letter as recorded with the conventional single-pickup scanning system. Fig. 8*a* illustrates the letter T received from a transmitter which happens to scan the letter as shown in Fig. 7*a*. In this case there is no distortion of the letter as recorded. In Fig. 8*b* the recorded letter is shown corresponding to Fig. 7*b*, assuming that the transmitted signal is keyed by the transmitter so that no marking signal is transmitted if the scanned area is less than about 40 to 50% of the shading represented by solid black, and substantially full marking amplitude for darker tone shading. The clipping of the signal in this manner has been found to increase the legibility in recording typed or printed messages by apparatus employing marking and spacing signals to represent the black and white portions of the copy. It will be seen that the recorded letter shown in 7*b* is not appreciably distorted although it is displaced slightly in position on account of the relationship of the original letter to the scanning lines of the transmitting apparatus. However, with the relationship shown in Fig. 7*c* the recorded letter would show only the cross-bar of the T as indicated in Fig. 8*c*. The reason for this as explained above is that the scanning system is arranged to generate a marking signal only if the density of the area being scanned is above about 40 to 50% of black. Consequently the cross-bar of the T will be elongated as shown and the stem not recorded at all, as shown in Fig. 8*c*, where the usual scanning system is employed. This indicates that the scanning definition (lines per inch) would have to be substantially increased for legible recording with the conventional scanning system. Similarly, if the scanning system is arranged to generate a marking signal only if the scanned area is at least 55% or 60% black, the cross-bar of the T would be recorded as shown in Fig. 8*d* but the stem of the T would still be unrecorded.

Figure 9:
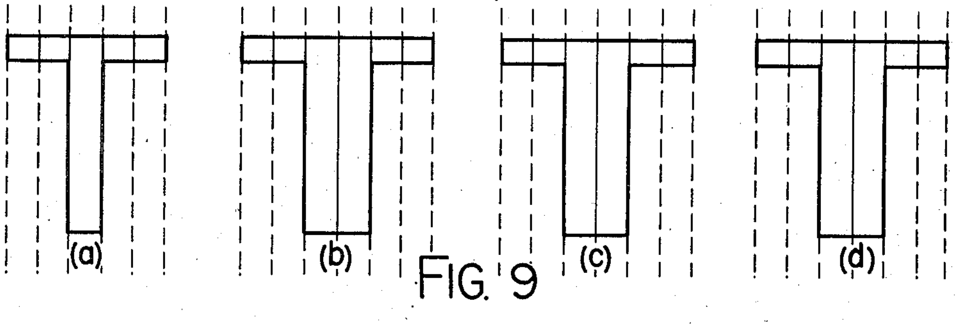

Fig. 9 illustrates the recording of the same letter that would be accomplished by a scanning arrangement according to the invention employing the dual optical system of Fig. 1 and arranged to key the marking signal on at about 50% of black. As indicated in Fig. 9*a*, the recording of the letter is undistorted when the stem of the T coincides with the axis of the scanning line. When the letter is displaced as indicated in Fig. 7*b*, the letter is recorded as shown in Fig. 9*b* as will be explained in connection with the explanation of the keying system below. Briefly, this keying system generates a marking signal if either photocell 18 picks up the tone corresponding to above 50% of black or other selected adjustment. Both the stem and the cross-bar of the T are widened, but the legibility of the recording is substantially unaffected. The recording of the letter T under the conditions indicated in Figs. 7c and 7d with the keying system responsive to about 40% and 60% of black, respectively, are shown in Figs. 9c and 9d.

Figure 4:
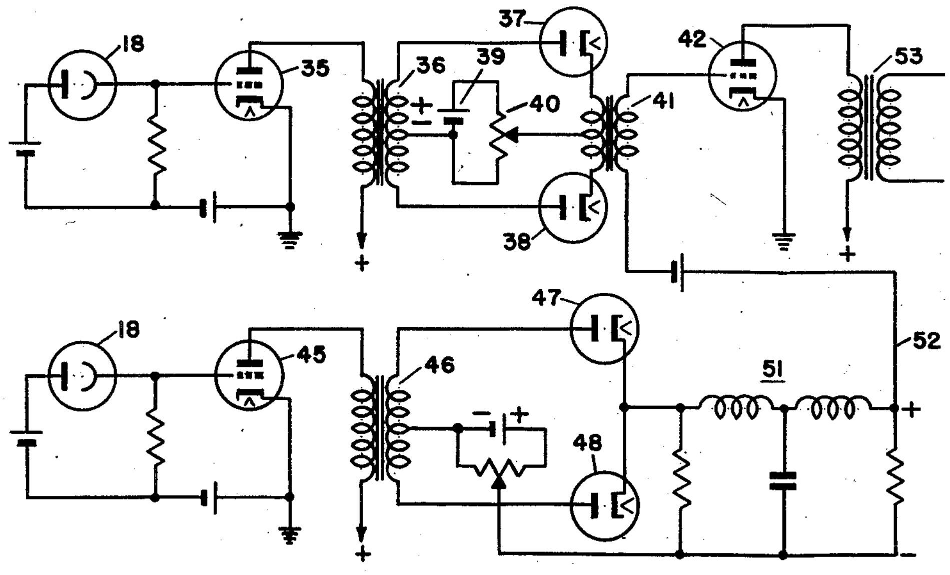
Figs. 4 and 5 are schematic circuit diagrams of the preferred amplifiers and associated equipment arranged for negative and positive transmission, respectively.

Fig. 4 illustrates a preferred keying system for negative transmission (in which the marking signal corresponding to the black copy is represented by minimum current output). The photocells 18, 18 correspond to the photocells shown in Fig. 1 and for the purposes of explanation it will be assumed that each is illuminated by light reflected from one-half of the scanning line 22 or by opposite halves of the scanning area at any instant. While the divisions of the scanning area preferably on opposite sides of the centerline of the scanning line, as described, they may be lined up at an angle to said line if desired. The upper photocell 18 is connected to an amplifier 35 which is shown as a triode operating as a class A amplifier for the photocell output carrier wave. The output of the amplifier 35 is connected through a transformer 36 to a threshold limiter comprising two diodes 37 and 38. The limiter tubes are biased by a battery 39 with an adjustable shunt or potentiometer 40 as in the conventional circuit. The output of the limiter is connected through a transformer 41 to a keying tube 42, which is biased beyond cut-off with no signal. Since the bias on the threshold limiter is adjusted until there is no signal output unless the input exceeds a predetermined maximum there will be no output signal in the secondary of the transformer 41 until the illumination of the photocell 18 exceeds a predetermined value, e. g., 50% of black or some other selected value which will give the desired recording results. Similarly, the lower photocell 18 is connected to an amplifier tube 45 corresponding to the tube 35. The output of the amplifier tube 45 is connected through a transformer 46 to a threshold limiter similar to that as provided for the first photocell amplifier and including the diodes 47 and 48. The output of the threshold limiter is passed through a filter 51 to eliminate the carrier frequency, and the pulsating direct current varying in accordance with the excitation of the photocell is impressed upon the keying tube 42 through conductor 52 to overcome the cut-off negative bias of tube 42 when the lower photocell 18 scans white. The output signal of the keying tube 42 is thus controlled in accordance with the pickup of the photocells and a signal output current from tube 42 is generated only when both photocells scan white. The output circuit of the tube 42 may include an output transformer 53 as shown. Since this arrangement is designed for negative transmission in which the maximum signal output corresponds to white and the marking signal is a no-current signal, it will be apparent that a marking signal is generated when either photocell scans black or a predetermined percentage of black tone shading.

Figure 5:
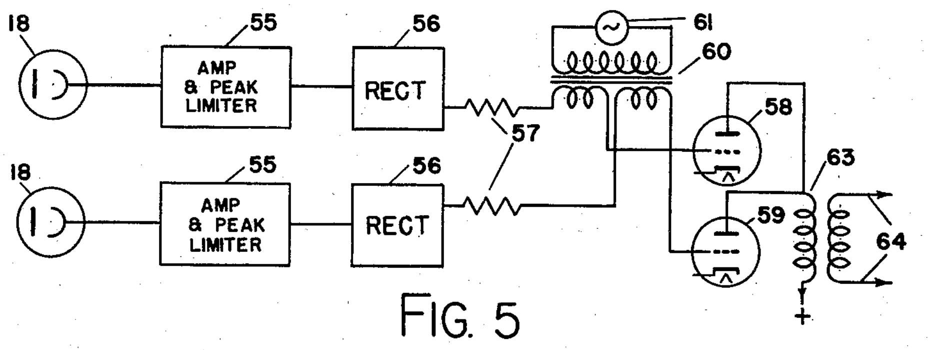

If desired, the system may be arranged for positive transmission in which the marking signal is represented by current instead of the no-current condition. This arrangement in a preferred form is illustrated in Fig. 5. Referring to this figure, the output of each of the photocells 18 is connected to amplifying, limiting and rectifying means represented diagrammatically at 55 and 56. The output currents of the rectifiers 56 are impressed through resistors 57 upon the control grids of two amplifiers 58, 59. As shown, a transformer 60 is also provided, the secondary windings of which are in series with the input circuits of the amplifiers 58, 59. A source 61 of alternating potential is connected to the primary winding of the transformer 60 so that a carrier is induced in the input circuit of each of the amplifiers 58, 59. This keying system works as follows:

So long as either photocell picks up enough illumination from the copy to produce an output signal of sufficient amplitude through the peak limiter 55, the signal is rectified and employed to bias the corresponding amplifier 58 or 59 to cut-off so that the carrier from the source 61 does not appear in the output circuit of said amplifier. However, when the excitation of either one of the photocells is reduced to such a point that the rectified bias potential is ineffective to cut off the signal, the carrier appears in the output circuit of the associated amplifier 58 or 59. A transformer 63 is shown for combining the outputs of the amplifiers 58 and 59, the secondary winding of said transformer being connected to the output circuit 64. Consequently, as explained above, the scanning system may be adjusted to generate marking signals when either photocell 18 scans black or a selected tone value less than black which will give the desired recording results. The expression "less than black" refers to the condition when at least a part of the scanned area is not black.

It will be apparent that the described scanning arrangements embodying the invention possess outstanding advantages since the combining of the signals from a plurality of scanning units enables satisfactory transmission to be effected at a much greater speed than with conventional scanning apparatus. The construction of the optical unit is simple since a single fixed optical element of a conventional type is employed to direct the light from the scanned area along the plurality of divergent paths. However, other equivalent means may be employed for simultaneously scanning a plurality of adjacent, overlapping or separated areas, depending upon the function of the apparatus and the construction of the associated receiving equipment. The scanning area may be divided into three parts by using an optical wedge having a narrow flat between the wedge-shaped side portions. The three resultant signals may be combined in a similar manner to that described in connection with Figs. 4 and 5. Various other modifications of the detailed arrangements described above for the purpose of explaining the invention may be made without departing from the scope thereof as defined in the appended claims.

I claim:

1. An electro-optical scanning system for a machine of the character described comprising a support for the copy to be scanned, a scanning mechanism adjacent said support including a pair of photocells and means directing light simultaneously from separate areas of the copy on the respective photocells to scan separately each half of the scanning line by each photocell, means including said scanning mechanism for generating two separate carriers of the same frequency, each amplitude-modulated by different ones of said photocells, a common output circuit for said scanning system and electric current-responsive means interposed between said carrier generating means and said output circuit for producing a marking signal of a predetermined character in said circuit when either of the said photocells scans black and the opposite or spacing signal therein only when both of said photocells simultaneously scan white on the copy.

2. An electro-optical scanning system for a machine of the character described comprising a support for the copy to be scanned, a scanning mechanism adjacent said support including a pair of photocells and means directly light simultaneously from separate areas of the copy on the respective photocells to scan separately each half of the scanning line concurrently, by each photocell, means including said scanning mechanism for generating two separate carriers of the same frequency, each amplitude-modulated by different ones of said photocells, a common output circuit for said scanning system including a grid-controlled tube amplifier, means for normally impressing cut-off bias on the control grid thereof, means for impressing one of said carriers on said control grid, means for rectifying the other of said carriers and for applying the rectified carrier to overcome said grid cut-off bias whenever said other carrier exceeds a predetermined amplitude and thereby produce a current flow in said output circuit only when both carriers occur simultaneously.

3. An electro-optical scanning system for a machine of the character described comprising a support for the copy to be scanned, a scanning mechanism adjacent said support including a pair of photocells and means directing light simultaneously from separate areas of the copy on the respective photocells to scan separately each half of the scanning line concurrently, by each photocell, means including said scanning mechanism for generating two separate carriers of the same frequency, each amplitude-modulated by different ones of said photocells, a common output circuit for said scanning system, means for separately rectifying each of said separate carriers, a separate alternating-current signal source associated with said common output circuit and means including said rectifying means to key said separate signal source to produce a signal current in said common output circuit only when one or both of said carriers are suppressed by scanning black areas of the copy with one or both of said photocells.

4. In a facsimile transmitter, a support for the copy to be transmitted, scanning apparatus therefor, said support and scanning apparatus being relatively movable, said scanning apparatus comprising a plurality of photocells and means for illuminating each photocell simultaneously in accordance with the tone shading or density of separate segments of the elemental scanning area of the copy, means including said photocells for concurrently generating separate carrier currents of the same frequency each modulated in amplitude by the different ones of said photocells according to the intensity of the illumination thereof, a common output circuit for said transmitter and a keying system connected to said carrier generating means for producing a black or marking output signal variation in said circuit upon a predetermined decrease in the amplitude of any of said single-frequency carrier currents and the opposite white or spacing output signal variation in said circuit only when all said carrier currents are at a maximum from concurrently scanning white areas of the copy.

5. In a facsimile transmitter, scanning apparatus for the copy to be transmitted comprising a double optical system for concurrently scanning separate halves of the scanning line on the copy, means including said double optical system for simultaneously generating two separate carrier currents of the same frequency each varied in accordance with the light from the separate elemental scanning areas of the copy and circuit means for combining said carrier currents and producing a marking output signal variation upon a predetermined decrease in the amplitude of either of said carrier currents, when scanning black on the copy, and the opposite spacing output signal variation only when both said carrier currents are above a predetermined level as a result of scanning white simultaneously in both scanned areas of the copy.

AUSTIN G. COOLEY.

REFERENCES CITED

The following references are of record in the file of this patent:

UNITED STATES PATENTS

| Number | Name | Date |
|---|---|---|
| 1,789,686 | Ranger | Jan. 20, 1931 |
| 1,943,900 | Mueller | Jan. 16, 1934 |
| 2,138,577 | Gray | Nov. 29, 1938 |
| 2,229,125 | Pray | Jan. 21, 1941 |

FOREIGN PATENTS

| Number | Country | Date |
|---|---|---|
| 468,837 | Great Britain | July 13, 1937 |
| 829,862 | France | July 8, 1938 |